UNITED STATES PATENT OFFICE.

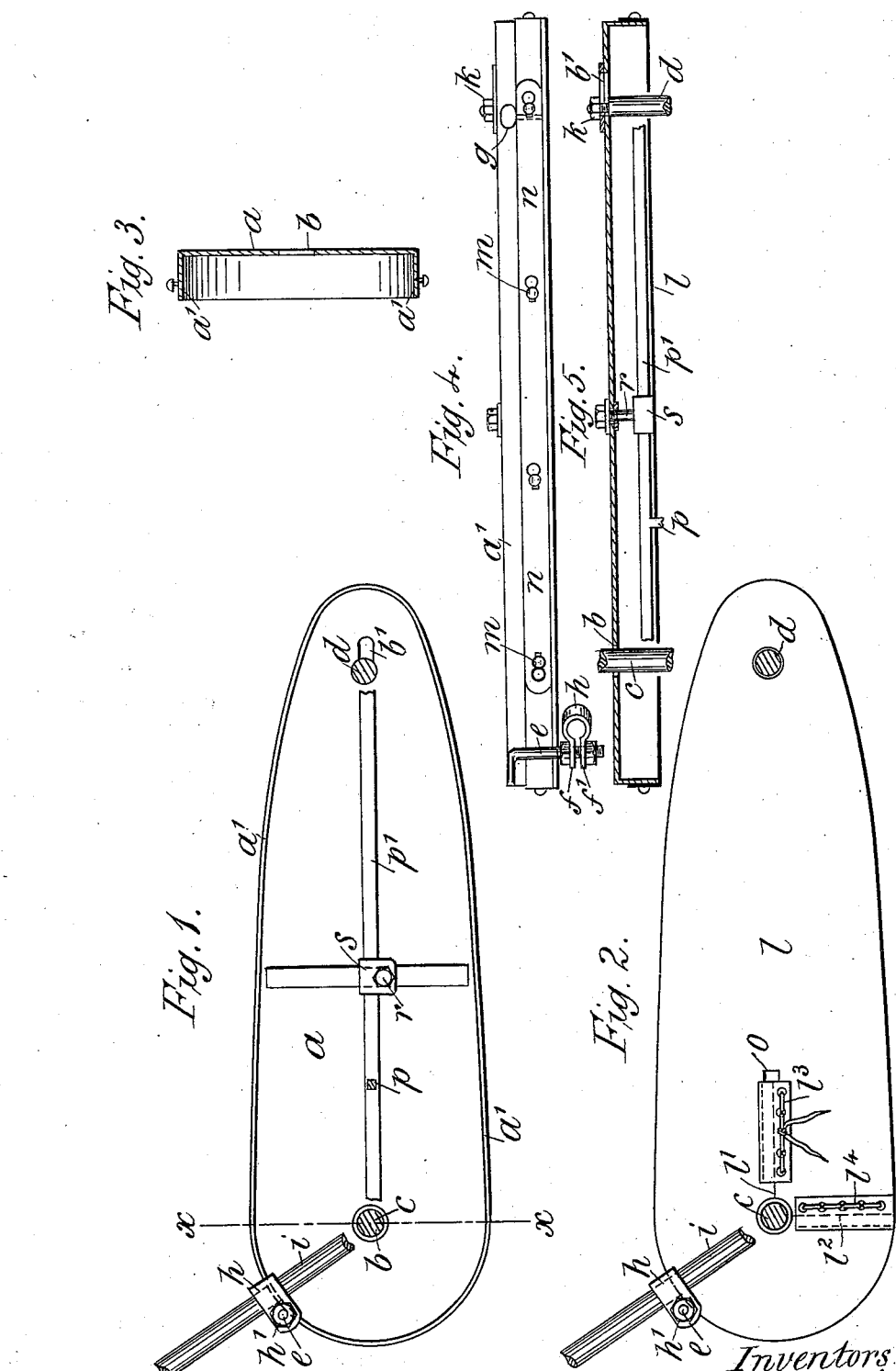

CHARLES WILLIAM BLUEMEL, ERNEST ADOLPHUS BLUEMEL, AND FRANK HENRY BLUEMEL, OF LONDON, ENGLAND.

COVER OR CASE FOR CHAIN-GEAR OF VELOCIPEDES.

SPECIFICATION forming part of Letters Patent No. 507,670, dated October 31, 1893.

Application filed May 29, 1893. Serial No. 475,963. (No model.) Patented in England December 8, 1892, No. 22,539.

*To all whom it may concern:*

Be it known that we, CHARLES WILLIAM BLUEMEL, ERNEST ADOLPHUS BLUEMEL, and FRANK HENRY BLUEMEL, subjects of the Queen of Great Britain and Ireland, and residents of Crown Works, Rose Place, Globe Road, London, England, have invented certain new and useful Improvements in Covers or Cases for the Chain-Gear of Velocipedes, (for which we have obtained a patent in Great Britain, No. 22,539, bearing date December 8, 1892,) of which the following is a specification.

Our invention relates to a new or improved cover or case for the chain gear of velocipedes which can be readily detached, adjusted, or fixed in position, is light in construction and will not produce any rattling as generally occurs with the gear covers hitherto used.

In carrying our invention into practice we provide a plate of xylonite or celluloid or such like material surrounded with a rim or flange and furnished with a perforation at one end, through which the end of the rear wheel axle protrudes when the cover is in position, and another similar perforation at the other or front end of the gear cover to receive the pedal crank, this last mentioned end of our improved gear cover being moreover furnished with a pin terminating in a screw thread and a small portion is cut away from the aforementioned rim or flange of the gear case or cover to take the rear fork of the velocipede. We further provide a clip formed of a split ring having two flanges or lugs one at each end, these lugs having a hole pierced through them to receive the pin aforesaid. This clip is placed astride over the bottom tube of the velocipede and secured thereto by the aforementioned pin being passed through the holes in the lugs and secured by a nut. The gear cover is thus fixed at one end, while it is fixed at the other end by a nut placed on the end of the rear wheel axle which is screw-threaded for this purpose. We further provide our gear cover with a back of any soft material such as leather, American cloth canvas or the like so cut away as to take parts of the velocipede, and which may be affixed to the gear cover proper by any suitable means.

In the accompanying sheet of drawings illustrating our invention Figure 1 represents an inside view of our improved cover or case with the back detached. Fig. 2 being a similar view with the back in position. Fig. 3 is a cross section on line $x\ x$ of Fig. 1. Fig. 4 is a top or edge view of the said cover or case, and Fig. 5 is a horizontal section thereof.

$a$ is the cover or case formed with a flanged rim or edge $a'$ all round it. $b$ is a perforation or hole formed in the side thereof for the passage of the pedal crank axle $c$, and $b'$ is an elongated opening or slot through which the end of the rear wheel axle $d$ protrudes.

The front end of the case is furnished with a pin $e$ threaded at its outer end to receive two nuts $f\ f'$, and a small portion of the said flange or rim is cut away at $g$ to receive the rear fork of the machine.

$h$ is a split ring or clip provided with two lugs $h'$ perforated to receive the aforesaid threaded pin $e$. This ring clips the bottom tube $i$ of the velocipede and is tightly secured thereto by means of the nuts $f\ f'$ thereby supporting and securely fixing the front end of the case $a$ to the said tube $i$. The other end of the case is supported by the axle of the rear wheel to which it is firmly secured by a nut $k$ screwed on the end of the said axle.

$l$ is a back formed of leather or other suitable material and fastened to the cover by means of studs $m$ fixed to the rim $a'$ and steel strips $n$ perforated as shown in Fig. 4 to receive and be locked by the said studs, the overlapping edges of the back $l$ being formed with eyelets through which the studs pass.

The back $l$ is cut or slit at $l'\ l^2$ for convenience in removing or fixing it to the cover. These slits are covered by flaps $l^3\ l^4$ for the purpose of excluding all dirt and dust as shown in Fig. 2 so that by unlocking the strips $n$ the cover can be readily removed. $o$ is a small opening formed in the back $l$ for the purpose of receiving the small cross piece $p$ connecting the horizontal bar $p'$ of the frame. The case or cover $a$ may be further secured by means of a screwed pin or bolt $r$ passing through the case and fastened by means of a clip or plate $s$ to the horizontal bar $p'$.

Having now described our invention, what we claim as new is—

In a gear cover or case for velocipedes the combination of the steel strips $n$ with the studs $m$ for the purpose of fixing the back $l$ to the cover or case $a$ substantially as described and shown.

In witness whereof we have hereunto set our hands in presence of two witnesses.

CHARLES WILLIAM BLUEMEL.
    ERNEST ADOLPHUS BLUEMEL.
    FRANK HENRY BLUEMEL.

Witnesses:
    ALFRED L. SIMPSON,
    CHARLES LEASON.